United States Patent
Nam et al.

(10) Patent No.: US 11,147,060 B2
(45) Date of Patent: Oct. 12, 2021

(54) MANAGEMENT OF MULTIPLE ANTENNA PANELS

(71) Applicant: QUALCOMM Incorporated, San Diego, CA (US)

(72) Inventors: Wooseok Nam, San Diego, CA (US); Tao Luo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 16/678,769

(22) Filed: Nov. 8, 2019

(65) Prior Publication Data

US 2020/0169995 A1  May 28, 2020

Related U.S. Application Data

(60) Provisional application No. 62/772,510, filed on Nov. 28, 2018.

(51) Int. Cl.
*H04W 72/04* (2009.01)
*H04W 72/08* (2009.01)

(52) U.S. Cl.
CPC ....... *H04W 72/044* (2013.01); *H04W 72/048* (2013.01); *H04W 72/0413* (2013.01); *H04W 72/085* (2013.01)

(58) Field of Classification Search
CPC .. H04B 7/0404; H04B 7/0628; H04B 7/0691; H04W 72/0413; H04W 72/044; H04W 72/048; H04W 72/085
See application file for complete search history.

(56) References Cited

U.S. PATENT DOCUMENTS

| 2018/0206132 A1* | 7/2018 | Guo | H04B 7/02 |
| 2019/0028167 A1* | 1/2019 | Chang | H04B 7/0413 |
| 2019/0132851 A1* | 5/2019 | Davydov | H04B 7/088 |
| 2019/0173534 A1* | 6/2019 | Kakishima | H04W 52/24 |

(Continued)

OTHER PUBLICATIONS

Huawei, et al., "Discussion on Panel-based UL Beam Selection," 3GPP Draft, 3GPP TSG RAN WG1 Meeting #94, R1-1809122, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 11, 2018 (Aug. 11, 2018), XP051516491, 7 pages, Retrieved from the Internet: URL: http://www.3gpp.org/ftp/tsg%5Fran/WG1%5FRL1/TSGR1%5F94/Docs/R1%2D1809122%2Ezip [retrieved on Aug. 11, 2018].

(Continued)

*Primary Examiner* — Kashif Siddiqui
(74) *Attorney, Agent, or Firm* — Harrity & Harrity, LLP (57) ABSTRACT

Various aspects of the present disclosure generally relate to wireless communication. In some aspects, a user equipment (UE) may transmit, to a base station (BS), panel information associated with identifying one or more characteristics associated with a plurality of antenna panels. In some aspects, the UE may receive, from the BS, a panel configuration message identifying a panel configuration to indicate one or more antenna panels, of the plurality of antenna panels, that the UE is to use for communication. In some aspects, the UE may communicate with the BS in accordance with the panel configuration. Numerous other aspects are provided.

34 Claims, 6 Drawing Sheets

(56) References Cited

U.S. PATENT DOCUMENTS

2020/0267536 A1* 8/2020 Zhou .................. H04W 8/24
2020/0267712 A1* 8/2020 Cirik .................. H04B 7/0691
2020/0344686 A1* 10/2020 Venugopal ........ H04W 52/0235

OTHER PUBLICATIONS

Intel Corporation: "On Codebook Based UL Transmission", 3GPP Draft, 3GPP TSG RAN WG1 Meeting #90, R1-1712537, On Codebook Based UL Transmission, 3rd Generation Partnership Project (3GPP), Mobile Competence Centre, 650, Route Des Lucioles, F06921 Sophia-Antipolis Cedex, France, vol. RAN WG1, No. Prague, P.R. Czechia, Aug. 21, 2017-Aug. 25, 2017, Aug. 20, 2017, XP051315353, 6 pages, Retrieved from the Internet: URL:http://www.3gpp.org/ftp/Meetings_3GPP_SYNC/RAN1/Docs/, [retrieved on Aug. 20, 2017].
International Search Report and Written Opinion—PCT/US2019/060725—ISA/EPO—dated Feb. 26, 2020.
Nokia, et al., "On UE Adaptation to the Traffic," 3GPP Draft, 3GPP TSG RAN WG1 Meeting #95, R1-1813620, 3rd Generation Partnership Project (3GPP), Mobile Competence Centre, 650, Route Des Lucioles, F-06921, Sophia-Antipolis Cedex, France, vol. RAN WG1, No. Spokane, USA; Nov. 12, 2018-Nov. 16, 2018, Nov. 11, 2018 (Nov. 11, 2018), XP051555678, 11 pages, Retrieved from the Internet: URL: http://www.3gpp.org/ftp/Meetings%5F3GPP%5FSYNC/RAN1/Docs/R1%2D1813620%2Ezip [retrieved on Nov. 11, 2018] section 2.4.

\* cited by examiner

MANAGEMENT OF MULTIPLE ANTENNA PANELS

CROSS-REFERENCE TO RELATED APPLICATION

This application claims priority to U.S. Provisional Patent Application No. 62/772,510, filed on Nov. 28, 2018, entitled "MANAGEMENT OF MULTIPLE ANTENNA PANELS," which is hereby expressly incorporated by reference herein.

FIELD OF THE DISCLOSURE

Aspects of the present disclosure generally relate to wireless communication, and more particularly to techniques and apparatuses for management of multiple antenna panels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting, to a base station (BS), panel information associated with identifying one or more characteristics associated with a plurality of antenna panels. The method may include receiving, from the BS, a panel configuration message identifying a panel configuration to indicate one or more antenna panels, of the plurality of antenna panels, that the UE is to use for communication. The method may include communicating with the BS in accordance with the panel configuration.

In some aspects, a UE for wireless communication may include memory and one or more processors operatively coupled to the memory. The memory and the one or more processors may be configured to transmit, to a base station (BS), panel information associated with identifying one or more characteristics associated with a plurality of antenna panels. The memory and the one or more processors may be configured to receive, from the BS, a panel configuration message identifying a panel configuration to indicate one or more antenna panels, of the plurality of antenna panels, that the UE is to use for communication. The memory and the one or more processors may be configured to communicate with the BS in accordance with the panel configuration.

In some aspects, a non-transitory computer-readable medium may store one or more instructions for wireless communication. The one or more instructions, when executed by one or more processors of a UE, may cause the one or more processors to transmit, to a base station (BS), panel information associated with identifying one or more characteristics associated with a plurality of antenna panels. The one or more instructions, when executed by the one or more processors of the UE, may cause the one or more processors to receive, from the BS, a panel configuration message identifying a panel configuration to indicate one or more antenna panels, of the plurality of antenna panels, that the UE is to use for communication. The one or more instructions, when executed by the one or more processors of the UE, may cause the one or more processors to communicate with the BS in accordance with the panel configuration.

In some aspects, an apparatus for wireless communication may include means for transmitting, to a base station (BS), panel information associated with identifying one or more characteristics associated with a plurality of antenna panels. The apparatus may include means for receiving, from the BS, a panel configuration message identifying a panel configuration to indicate one or more antenna panels, of the plurality of antenna panels, that the UE is to use for communication. The apparatus may include means for communicating with the BS in accordance with the panel configuration.

In some aspects, a method of wireless communication, performed by a base station (BS), may include receiving, from a user equipment (UE) with a plurality of antenna panels, panel information associated with identifying one or more characteristics associated with the plurality of antenna panels. The method may include transmitting, to the UE, a panel configuration message identifying a panel configuration to indicate one or more antenna panels, of the plurality of antenna panels, that the UE is to use for communication. The method may include communicating with the UE in accordance with the panel configuration.

In some aspects, a base station for wireless communication may include memory and one or more processors operatively coupled to the memory. The memory and the one or more processors may be configured to receive, from a user equipment (UE) with a plurality of antenna panels, panel information associated with identifying one or more characteristics associated with the plurality of antenna panels. The memory and the one or more processors may be configured to transmit, to the UE, a panel configuration message identifying a panel configuration to indicate one or more antenna panels, of the plurality of antenna panels, that the UE is to use for communication. The memory and the one or more processors may be configured to communicate with the UE in accordance with the panel configuration.

In some aspects, a non-transitory computer-readable medium may store one or more instructions for wireless communication. The one or more instructions, when executed by one or more processors of a base station, may cause the one or more processors to receive, from a user equipment (UE) with a plurality of antenna panels, panel information associated with identifying one or more characteristics associated with the plurality of antenna panels. The one or more instructions, when executed by the one or more processors of the base station, may cause the one or more processors to transmit, to the UE, a panel configuration message identifying a panel configuration to indicate one or more antenna panels, of the plurality of antenna panels, that the UE is to use for communication. The one or more instructions, when executed by the one or more processors of the base station, may cause the one or more processors to communicate with the UE in accordance with the panel configuration.

In some aspects, an apparatus for wireless communication may include means for receiving, from a user equipment (UE) with a plurality of antenna panels, panel information associated with identifying one or more characteristics associated with the plurality of antenna panels. The apparatus may include means for transmitting, to the UE, a panel configuration message identifying a panel configuration to indicate one or more antenna panels, of the plurality of antenna panels, that the UE is to use for communication. The apparatus may include means for communicating with the UE in accordance with the panel configuration.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
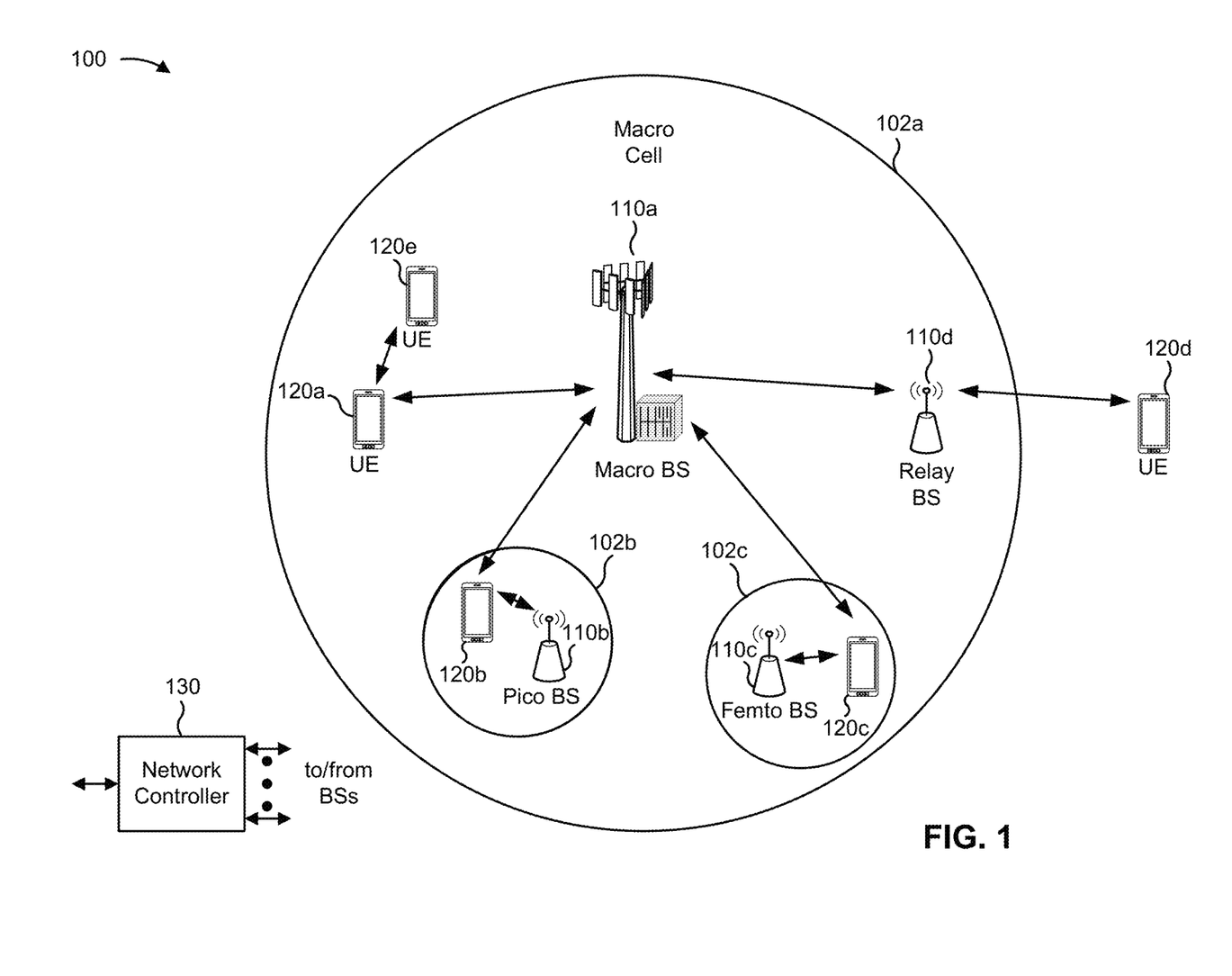
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

UEs 120 may include a plurality of antenna panels. For example, a UE 120 may communicate with one or more BSs 110 using at least one of a plurality of antenna panels. In some aspects, BS 110 may transmit a panel configuration message to identify a default antenna panel for UE 120, a secondary antenna panel for UE 120, and/or the like, as described in more detail below. In this case, UE 120 may communicate with BS 110 using the default antenna panel, and may maintain the secondary antenna panel in a sleep mode, thereby reducing a power utilization relative to other techniques for antenna panel management.

At a subsequent time, BS 110 may transmit an activation message to UE 120. For example, based at least in part on a link quality associated with the default antenna panel, BS 110 may activate the secondary antenna panel, and UE 120 may communicate with BS 110 using the secondary antenna panel and not the default antenna panel. In this way, a link quality may be improved. Moreover, based at least in part on UE 120 transferring the default antenna panel to the sleep mode, UE 120 may reduce power utilization relative to other techniques for antenna panel management. Additionally, or alternatively, BS 110 may activate both the default antenna panel and the secondary antenna panel, and UE 120 may enable transmit diversity to improve link quality using the default antenna panel and the secondary antenna panel.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what was described with regard to FIG. 1.

Figure 2:
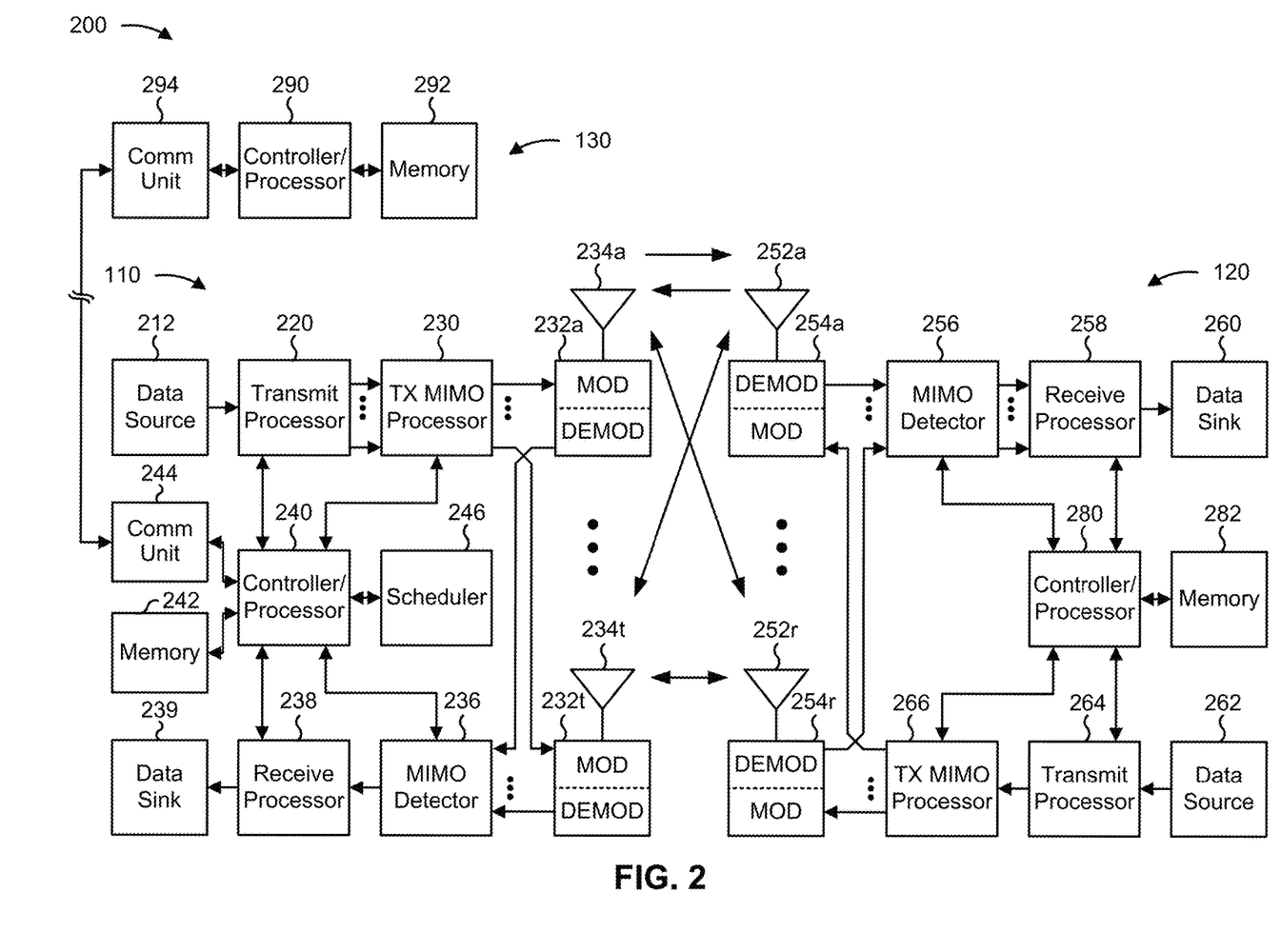
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with management of multiple antenna panels, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for transmitting, to a base station (BS), panel information associated with identifying one or more characteristics associated with a plurality of antenna panels, means for receiving, from the BS, a panel configuration message identifying a panel configuration to indicate one or more antenna panels, of the plurality of antenna panels, that the UE is to use for communication, means for communicating with the BS in accordance with the panel configuration, and/or the like. In some aspects, such means may include one or more components of UE 120 described in connection with FIG. 2.

In some aspects, base station 110 may include means for receiving, from a user equipment (UE) with a plurality of antenna panels, panel information associated with identifying one or more characteristics associated with the plurality of antenna panels, means for transmitting, to the UE, a panel configuration message identifying a panel configuration to indicate one or more antenna panels, of the plurality of antenna panels, that the UE is to use for communication, means for communicating with the UE in accordance with the panel configuration, and/or the like. In some aspects, such means may include one or more components of base station 110 described in connection with FIG. 2.

As indicated above, FIG. 2 is provided merely as an example. Other examples may differ from what was described with regard to FIG. 2.

In some communications systems, such as 5G or NR, a UE may communicate with one or more BSs using a plurality of beams and/or links. For example, the UE may communicate with one or more BSs using a single transmit receive point (TRP), a plurality of TRPs, and/or the like. In some cases, a single BS may include a plurality of TRPs which may allow a UE to communicate with the same BS via different TRPs. As examples, a single UE may communicate with a single BS using a single antenna panel (e.g., uplink and downlink), a single UE may communicate with a single BS using a plurality of antenna panels (e.g., a first antenna panel for uplink, a second antenna panel for downlink, and/or the like), a single UE may communicate with a plurality of BSs using a single antenna panel (e.g., uplink to a first BS and downlink from a second BS), a single UE may communicate with a plurality of BSs using a plurality of antenna panels (e.g., uplink or downlink with a first BS using a first antenna panel and uplink or downlink with a second BS using a second antenna panel), and/or the link. In some cases, a single UE may communicate with a plurality of BSs on both an uplink and a downlink using a plurality of antenna panels. For example, the UE may use a first antenna panel for uplink and downlink communication with a first BS and a second antenna panel for uplink and downlink communication with a second BS.

Each antenna panel may include an antenna array of antenna elements. A UE may turn on or off each antenna panel or port associated therewith. However, a panel configuration may be statically configured for a UE, which may use excessive power resources, such as when a plurality of antenna panels are configured but only a single antenna panel is needed. Similarly, the panel configuration may result in poor network performance when a link associated with an antenna panel experiences poor link quality.

Some aspects described herein enable management for multiple antenna panels. For example, a BS may transmit a panel configuration message to identify a panel configuration to indicate one or more antenna panels that a UE is to use for communication. In this case, the BS may transmit an activation message or a deactivation message to dynamically alter the panel configuration, such as based at least in part on a link quality, thereby enabling use of a power saving mode for antenna panels that are not needed for communication at a particular time. In some aspects, the BS may schedule communications based on the panel configuration to allow the UE to power off unused panels. In this way, the BS and the UE enable reduced power utilization by enabling the power saving mode, improved link quality by enabling dynamic activation and deactivation of different antenna panels with different links, and/or the like.

Figure 3A:
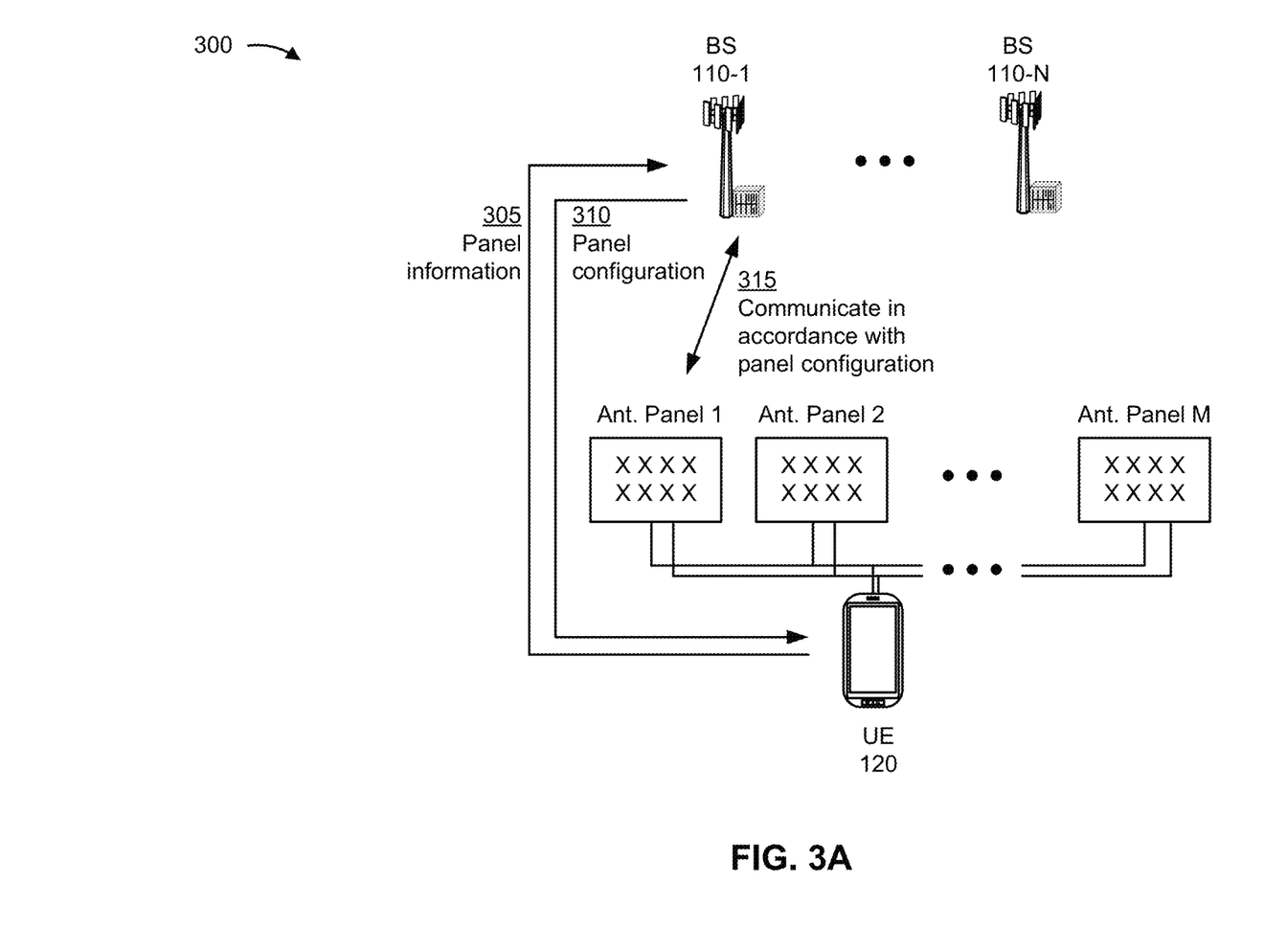
FIGS. 3A and 3B are diagrams illustrating an example of management of multiple antenna panels, in accordance with various aspects of the present disclosure.
Figure 3B:
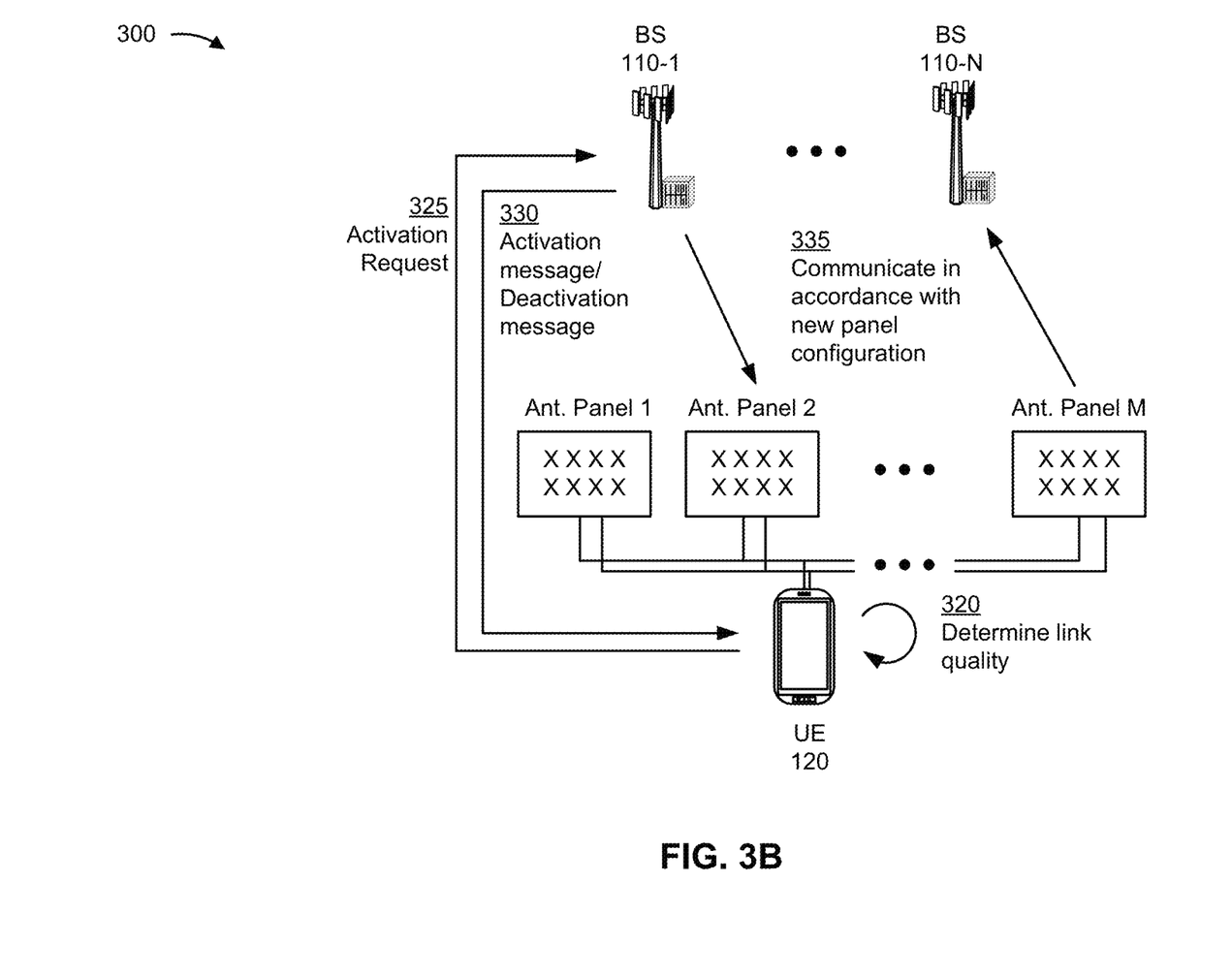

FIGS. 3A and 3B are diagrams illustrating an example 300 of management of multiple antenna panels, in accordance with various aspects of the present disclosure. As shown in FIG. 3A, example 300 includes a set of BSs 110-1 through 110-N (N≥1) and a UE 120 with a set of antenna panels 1 through M (M≥1). An antenna panel may be an array of antennas or antenna elements that may be located in the same physical location, share control circuitry, share transmission or reception circuitry, share common power procedures (e.g., that may be collectively powered on or powered off), may be used to form a shared beam (e.g., by controlling a gain, phase shift, and/or the like of each individual antenna or antenna element), and/or the like.

In some aspects, the set of BSs 110-1 through 110-N may be replaced by a plurality of TRPs corresponding to a single or more than one BS. In some aspects, each of the antenna panels, shown in FIGS. 3A and 3B, may be separate physical arrays, panels, or microchips located in different locations or orientations on the UE 120. In some aspects, each physical antenna panel may include a set of antenna elements, and a plurality of antenna elements may be grouped to form a 'virtual' antenna panel. For example, a single antenna panel may include a first group of antenna elements forming a first antenna panel for antenna panel management and a second group of antenna elements forming a second antenna panel for antenna panel management. In this case, each group of antenna elements may be configured as an independent antenna panel, as described herein in terms of managing antenna panels.

As further shown in FIG. 3A, and by reference number 305, BS 110-1 may receive panel information from UE 120. For example, UE 120 may provide information regarding antenna panels 1 through M. In some aspects, UE 120 may provide information identifying a characteristic of an antenna panel or an antenna array, a microchip, an antenna element, and/or the like available at the UE 120. For example, UE 120 may provide information identifying a quantity of antenna panels of UE 120. Additionally, or alternatively, UE 120 may provide information identifying groups of antenna panels that may be concurrently activated (e.g., powered on). For example, UE 120 may provide panel information indicating that antenna panel 1 and antenna panel 2 form a first antenna panel group that may be collectively activated or deactivated (e.g., powered off), and that other antenna panels (e.g., antenna panels 3 and 4) form a second antenna panel group that may be collectively activated or deactivated. Additionally, or alternatively, UE 120 may provide information identifying a quantity of antenna elements of each antenna panel. In some aspects, UE 120 may provide signaling identifying the panel information via a particular type of signaling. For example, UE 120 may provide a UE capability report including the panel information. Additionally, or alternatively, UE 120 may provide higher-layer signaling, such as a radio resource control (RRC) message and/or the like, including the panel information. In some aspects, UE 120 may transmit a sounding reference signal (SRS) for channel estimation of a channel.

As further shown in FIG. 3A, and by reference number 310, BS 110-1 may provide panel configuration information identifying a panel configuration. For example, BS 110-1 may provide, to UE 120, the panel configuration to identify one or more antenna panels, of the set of antenna panels 1 through M, that UE 120 is to use for communication with BS 110-1, BS 110-N, and/or the like.

In some aspects, BS 110-1 may provide panel configuration information identifying a default antenna panel (which may be termed an anchor antenna panel), a secondary antenna panel (which may be termed a supplementary antenna panel), and/or the like. For example, BS 110-1 may provide panel configuration information identifying a fixed antenna panel and/or an antenna panel index for a default antenna panel that UE 120 is to use for communication. Additionally, or alternatively, BS 110-1 may provide information identifying a bandwidth part or a carrier associated with an antenna panel. In this case, UE 120 may use a particular antenna panel corresponding to a particular bandwidth part or carrier as a default antenna panel when using the particular bandwidth part or the carrier.

In some aspects, BS 110-1 may provide panel configuration information to identify a default antenna panel that is to be statically configured. In other words, BS 110-1 may indicate that UE 120 is to maintain the default antenna panel in an always-on configuration, and may indicate that UE 120 is to selectively activate and/or deactivate one or more of a plurality of secondary antenna panels based at least in part on one or more factors described in more detail herein. Additionally, or alternatively, BS 110-1 may provide panel configuration information to identify a default antenna panel that is to be dynamically activated and deactivated. For example, BS 110-1 may indicate that UE 120 may deactivate a default antenna panel and activate a secondary antenna panel, and may indicate that when the inactivity timer expires, as described in more detail herein, UE 120 is to reactivate the default antenna panel.

As further shown in FIG. 3A, and by reference number 315, BS 110-1 and UE 120 may communicate in accordance with the panel configuration. For example, UE 120 may transmit information to BS 110-1 using antenna panel 1, and may receive information from BS 110-1 using antenna panel 1. In some aspects, UE 120 may use antenna panel 1 for a particular type of communication. For example, based at least in part on antenna panel 1 being configured as a default antenna panel, UE 120 may transmit or receive a control channel (e.g., a physical uplink control channel (PUCCH)), a data channel (e.g., a physical uplink shared channel (PUSCH)), a reference signal (e.g., a sounding reference signal (SRS)), and/or the like using antenna panel 1. For example, UE 120 may perform panel-selection-based transmission of a PUSCH, a PUCCH, and/or an SRS based at least in part on having received an identifier of a panel, as described above. In this case, UE 120 may use a beam paired link associated with antenna panel 1 for uplink transmission and/or downlink transmission. For example, UE 120 may transmit an SRS through a newly activated panel for uplink channel estimation.

In some aspects, UE 120 may forgo using other antenna panels in accordance with the panel configuration. For example, UE 120 may maintain antenna panels 2 through M in a sleep state (or a sleep mode) to reduce a power utilization (e.g., relative to maintaining antenna panels 2 through M in an active state) when UE 120 is to use only antenna panel 1 for communication. In this case, BS 110-1 may not transmit data using beams associated with antenna panels 2 through M, thereby avoiding dropped communications associated with inadvertently transmitting using the beams associated with antenna panels 2 through M while UE 120 is not monitoring for signals using antenna panels 2 through M. The sleep state may refer to a state of UE 120 with a particular group of parameters set for UE 120, such as parameters set to have an antenna panel powered off, circuitry associated with an antenna panel powered off, circuitry associated with monitoring signals received at a panel powered off, receive power reduced relative to a non-sleep state (e.g., an awake state), refrain from monitoring for received signals, and/or the like.

In some aspects, UE 120 may set a particular parameter when maintaining an antenna panel in a sleep state. For example, UE 120 may turn off (or transfer to a low power state) one or more components of an antenna panel and/or associated therewith, such as a power amplifier, a mixer, an oscillator, a phase locked loop, a filter, an analog to digital converter, a digital to analog converter, a processing component (e.g., a channel measurement procedure, a tracking procedure, an uplink transmission procedure, and/or the like).

As shown in FIG. 3B, and by reference number 320, UE 120 may determine a link quality. For example, UE 120 may perform a measurement of link quality for a link with BS 110-1 using antenna panel 1, and may determine the link quality based at least in part on the measurement of link quality. In some aspects, UE 120 may determine that the link quality does not satisfy a threshold. For example, UE 120 may determine that a reference signal received power (RSRP) does not satisfy an RSRP threshold, that a reference signal received quality (RSRQ) does not satisfy an RSRQ threshold, and/or the like. In this case, based at least in part on determining that the link quality does not satisfy a threshold, UE 120 may determine to trigger an activation of a secondary panel to enable use of a link with improved link quality relative to a link associated with a default antenna panel.

As further shown in FIG. 3B, and by reference number 325, UE 120 may provide an activation request. For example, UE 120 may provide, to BS 110-1, a request for activation of an antenna panel (e.g., antenna panel 2), for deactivation of an antenna panel (e.g., antenna panel 1), and/or the like based at least in part on the link quality, a buffer status, or the like. In some aspects, BS 110-1 may determine to activate an antenna panel and/or deactivate an antenna panel without having received a request from UE 120. For example, BS 110-1 may determine a link quality, a bandwidth requirement, an amount or type of data to be transmitted to the UE 120, and/or the like, and may determine to activate an antenna panel and/or deactivate an antenna panel based at least in part on the link quality, the bandwidth requirement, the amount or type of data to be transmitted to the UE 120, and/or the like.

As further shown in FIG. 3B, and by reference number 330, BS 110-1 may provide an activation message and/or a deactivation message. For example, BS 110-1 may provide the activation message and the deactivation message to UE 120 to cause UE 120 to switch from communication using antenna panel 1 to communication using antenna panel 2 and antenna panel M. In this case, UE 120 may activate a port associated with, for example, antenna panel 2 to activate antenna panel 2. In some aspects, BS 110-1 may activate a single antenna panel. For example, BS 110-1 may activate the single antenna panel using a single activation message. Additionally, or alternatively, BS 110-1 may activate a plurality of antenna panels using the single activation message (e.g., based at least in part on transmitting an activation message for a group of antenna panels). Additionally, or alternatively, BS 110-1 may activate a plurality of antenna panels using a plurality of activation messages. Similarly, BS 110-1 may deactivate one or more antenna panels using one or more deactivation messages.

In some aspects, UE 120 may activate or deactivate an antenna panel without receiving an activation or deactivation message from BS 110-1. For example, when UE 120 is not transmitting or receiving using a particular antenna panel, an inactivity timer may decrease (and when UE 120 does transmit or receive, the inactivity timer may be reset to an initial value). In this case, upon expiration of the inactivity timer, UE 120 may activate or deactivate a particular antenna panel. In some aspects, BS 110-1 may use another inactivity timer to track a state of antenna panels of UE 120. In some aspects, UE 120 and/or BS 110-1 may set the inactivity timer on a per antenna panel basis. For example, UE 120 and/or BS 110-1 may set a first inactivity timer for a first antenna panel, and may set a second inactivity timer for a second antenna panel. In some aspects, UE 120 and/or BS 110-1 may set the inactivity timer on a per activation command basis. For example, UE 120 and/or BS 110-1 may set the inactivity timer for each antenna panel activated using a particular activation command.

In some aspects, BS 110-1 may use a particular signaling message to activate an antenna panel and/or deactivate an antenna panel. For example, BS 110-1 may transmit a media access control (MAC) control element to activate or deactivate an antenna panel. Additionally, or alternatively, BS 110-1 may use a downlink control information (DCI) message, such as a dedicated DCI for activation or deactivation, a field of a DCI associated with another signaling purpose (e.g., a panel switch field of a scheduling DCI), and/or the like. Additionally, or alternatively, BS 110-1 may use a transmission configuration indicator (TCI) field associated with cross-panel scheduling to activate or deactivate an antenna panel. For example, BS 110-1 may use a TCI field of a scheduling DCI to indicate a receiver beam associated with a secondary antenna panel, which may cause UE 120 to activate the secondary antenna panel and deactivate a default antenna panel. In this way, BS 110-1 may use signaling transmitted and/or received on a first panel (e.g., the secondary antenna panel) to control activation and/or deactivation of a second panel (e.g., the default panel).

In some aspects, BS 110-1 may set a scheduling offset associated with the scheduling DCI to accommodate a latency associated with UE 120 switching from the default antenna panel to the secondary antenna panel. For example, UE 120 may use a threshold amount of to power the secondary antenna panel on and configure the secondary antenna panel for transmission/reception, and the scheduling offset may be set to accommodate the threshold amount of time. In this way, UE 120 accounts for an activation latency (e.g., a delay in an amount of time to power up an antenna to be available for transmission and/or reception) when switching from the default antenna panel to the secondary antenna panel. For example, UE 120 may account for an activation latency in activating (and configuring) or deactivating antennas or antennal elements of an antenna panel.

In some aspects, BS 110-1 may use a signaling message associated with causing a different configuration alteration to alter a panel configuration. For example, BS 110-1 may use a bandwidth part switching message to activate an antenna panel and/or deactivate an antenna panel associated with a corresponding bandwidth part or bandwidth part configuration. Additionally, or alternatively, BS 110-1 may use a bandwidth part switching message to activate or deactivate an antenna panel associated with a different bandwidth part or bandwidth part configuration. Similarly, a secondary cell activation message, a radio resource management (RRM) measurement signal, and/or the like may be used for antenna panel activation and/or deactivation.

In some aspects, BS 110-1 and/or UE 120 may perform one or more other actions in connection with activation and/or deactivation of an antenna panel. For example, based at least in part on receiving an activation message, UE 120 may transmit a sounding reference signal (SRS) using a newly activated antenna panel to enable uplink channel estimation for the newly activate antenna panel. Additionally, or alternatively, BS 110-1 may transmit a channel state information reference signal (CSI-RS) or a tracking reference signal (TRS) to enable fast ramp-up of a newly activated antenna panel. In this case, UE 120 may use the CSI-RS or the TRS for automatic gain control (AGC), time tracking, frequency tracking, beam tracking, and/or the like. In some aspects, BS 110-1 may transmit the CSI-RS or the TRS on activation of the newly activated antenna panel. In some aspects, BS 110-1 may transmit the CSI-RS based at least in part on receiving a request for UE 120 after activation of the newly activated antenna panel.

As further shown in FIG. 3B, and by reference number 335, UE 120 may communicate with BS 110-1 and BS 110-N using antenna panel 2 and antenna panel M. For example, UE 120 may use antenna panel 2 for reception from BS 110-1 on a downlink and may use antenna panel M for transmission to BS 110-N on an uplink in accordance with a new panel configuration. In this case, UE 120 may receive and/or transmit control channels, data channels, and/or the like using antenna panels 2 through M in accordance with the new panel configuration. In some aspects, UE 120 may use antenna panel 1 (e.g., a default panel) and antenna panels 2 through M (e.g., secondary antenna panels). For example, UE 120 may use both default antenna panels and secondary antenna panels to achieve multi-link diversity, higher-rank transmission, and/or the like.

In this way, BSs 110 and UE 120 may manage multiple antenna panels to enable on-demand activation and deactivation of antenna panels, which may achieve power savings relative to static configuration of antenna panels by enabling use of a sleep mode for inactive antenna panels.

Although some aspects are described herein in terms of activating an deactivating antenna panels, as described above, some aspects may be used for activating and deactivating antenna elements, antenna circuits, and/or the like.

Although some aspects are described herein in terms of BS 110 and UE 120, any of the aspects discussed herein may be applied to any wireless communication device. For example, in some aspects, UE 120 may be replaced with another base station (such as a large cell, small cell, or femto cell base station), a customer premises equipment (CPE), or another wireless communication device. Similarly, as another example, BS 110-1 may, in some aspects, be replaced by any type of wireless communication device such as another UE 120, TRP, or the like.

As indicated above, FIGS. 3A and 3B are provided as an example. Other examples may differ from what was described with respect to FIGS. 3A and 3B.

Figure 4:
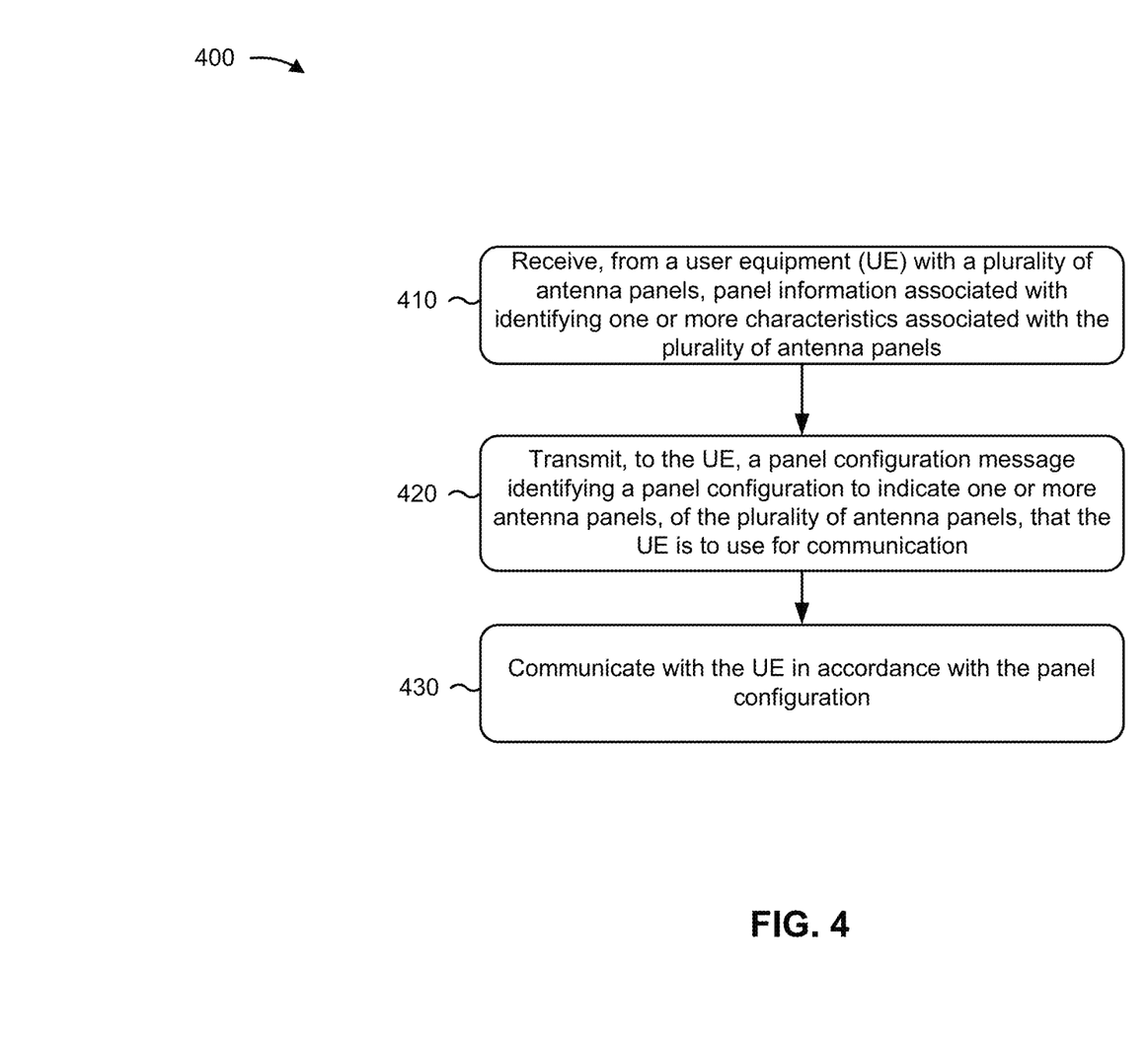
FIG. 4 is a diagram illustrating an example process performed, for example, by a base station, in accordance with various aspects of the present disclosure.

FIG. 4 is a diagram illustrating an example process 400 performed, for example, by a BS, in accordance with various aspects of the present disclosure. Example process 400 is an example where a BS (e.g., BS 110) performs management of multiple antenna panels.

As shown in FIG. 4, in some aspects, process 400 may include receiving, from a user equipment (UE) with a plurality of antenna panels, panel information associated with identifying one or more characteristics associated with the plurality of antenna panels (block 410). For example, the BS (e.g., using antenna 234, DEMOD 232, MIMO detector 236, receive processor 238, controller/processor 240, and/or the like) may receive, from a user equipment (UE) with a plurality of antenna panels, panel information associated with identifying one or more characteristics associated with the plurality of antenna panels, as described in more detail above.

As shown in FIG. 4, in some aspects, process 400 may include transmitting, to the UE, a panel configuration message identifying a panel configuration to indicate one or more antenna panels, of the plurality of antenna panels, that the UE is to use for communication (block 420). For example, the BS (e.g., using controller/processor 240, transmit processor 220, TX MIMO processor 230, MOD 232, antenna 234, and/or the like) may transmit, to the UE, a panel configuration message identifying a panel configuration to indicate one or more antenna panels, of the plurality of antenna panels, that the UE is to use for communication, as described in more detail above.

As shown in FIG. 4, in some aspects, process 400 may include communicating with the UE in accordance with the panel configuration (block 430). For example, the BS (e.g., using antenna 234, DEMOD 232, MIMO detector 236, receive processor 238, controller/processor 240, transmit processor 220, TX MIMO processor 230, MOD 232, antenna 234, and/or the like) may communicate with the UE in accordance with the panel configuration, as described in more detail above.

Process 400 may include additional aspects, such as any single aspect and/or any combination of aspects described below and/or in connection with one or more other processes described elsewhere herein.

In a first aspect, the one or more characteristics associated with the plurality of antenna panels includes a characteristic identifying at least one of: a quantity of antenna panels of the UE, a grouping of antenna panels, of the plurality of antenna panels, for concurrent activation or deactivation, or a quantity of antenna elements of a particular antenna panel of the plurality of antenna panels. In a second aspect, alone or in combination with the first aspect, the panel information is conveyed in a UE capability report or a radio resource control (RRC) message. In a third aspect, alone or in combination with one or more of the first and second aspects, the panel configuration indicates a set of default antenna panels or a set of anchor antenna panels. In a fourth aspect, alone or in combination with one or more of the first through third aspects, the set of default antenna panels or the set of anchor antenna panels includes a fixed antenna panel associated with a fixed index or a particular antenna panel associated with a bandwidth part or carrier.

In a fifth aspect, alone or in combination with one or more of the first through fourth aspects, a first antenna panel, of the plurality of antenna panels, is a first subset of antenna elements of a particular antenna panel and a second antenna panel, of the plurality of antenna panels, is a second subset of antenna elements of the particular antenna panel. In a sixth aspect, alone or in combination with one or more of the first through fifth aspects, the plurality of antenna panels is a set of separate physical arrays, panels, or microchips located in different locations or orientations on the UE. In a seventh aspect, alone or in combination with one or more of the first through sixth aspects, the BS is configured to transmit or receive at least one of a control channel or a data channel using a default antenna panel, of the one or more antenna panels, via a beam paired link associated with the default antenna panel. In an eighth aspect, alone or in combination with one or more of the first through seventh aspects, an inactive antenna panel, of the plurality of antenna panels and not included in the one or more antenna panels, operates in a sleep state based at least in part on the panel configuration, and the BS is configured to forgo communicating with the UE using the inactive antenna panel.

In a ninth aspect, alone or in combination with one or more of the first through eighth aspects, the panel configuration message is an activation message or a deactivation message for one or more supplementary antenna panels of the plurality of antenna panels. In a tenth aspect, alone or in combination with one or more of the first through ninth aspects, the activation message or the deactivation message is configured to activate or deactivate a single antenna panel or a group of antenna panels. In an eleventh aspect, alone or in combination with one or more of the first through tenth aspects, the BS is configured to transmit the activation message or the deactivation message as a response to receiving a request from the UE, and the request is triggered based at least in part on a link quality determination.

In a twelfth aspect, alone or in combination with one or more of the first through eleventh aspects, the BS is configured to transmit the activation message or the deactivation message using at least one of: a media access control (MAC) control element (CE) message, a dedicated downlink control information message, a field of a downlink control information message, a cross-panel scheduling message of a transmission configuration indication (TCI) field, a beam indicator indicating a beam associated with a particular antenna panel, a bandwidth part switching message, a secondary cell activation message, or a radio resource management measurement. In a thirteenth aspect, alone or in combination with one or more of the first through twelfth aspects, the activation message or deactivation message is transmitted in connection with a downlink or uplink scheduling message, and a scheduling offset is configured to accommodate activation latency. In a fourteenth aspect, alone or in combination with one or more of the first through thirteenth aspects, the BS is configured to use a default antenna panel and one or more secondary antenna panels for multi-link diversity or higher-rank transmission based at least in part on transmitting the activation message or the deactivation message.

In a fifteenth aspect, alone or in combination with one or more of the first through fourteenth aspects, the BS is configured to trigger a sounding reference signal transmission for a newly activated antenna panel in connection with transmitting the activation message or the deactivation message. In a sixteenth aspect, alone or in combination with one or more of the first through fifteenth aspects, the BS is configured to transmit a channel state information reference signal or a tracking reference signal to enable a ramp-up of a particular antenna panel of the one or more antenna panels in connection with transmitting the activation message or the deactivation message. In a seventeenth aspect, alone or in combination with one or more of the first through sixteenth aspects, the BS is configured to transmit channel state information reference signal or the tracking reference signal autonomously or as a response to a UE request.

In an eighteenth aspect, alone or in combination with one or more of the first through seventeenth aspects, the BS is configured to transmit the activation message or the deactivation message in connection with expiration of an inactivity timer. In a nineteenth aspect, alone or in combination with one or more of the first through eighteenth aspects, the inactivity timer is an antenna panel-specific inactivity timer or an activation message-specific inactivity timer. In a twentieth aspect, alone or in combination with one or more of the first through nineteenth aspects, the inactivity timer is related to transmission or reception of signals using at least one antenna panel of the one or more antenna panels.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
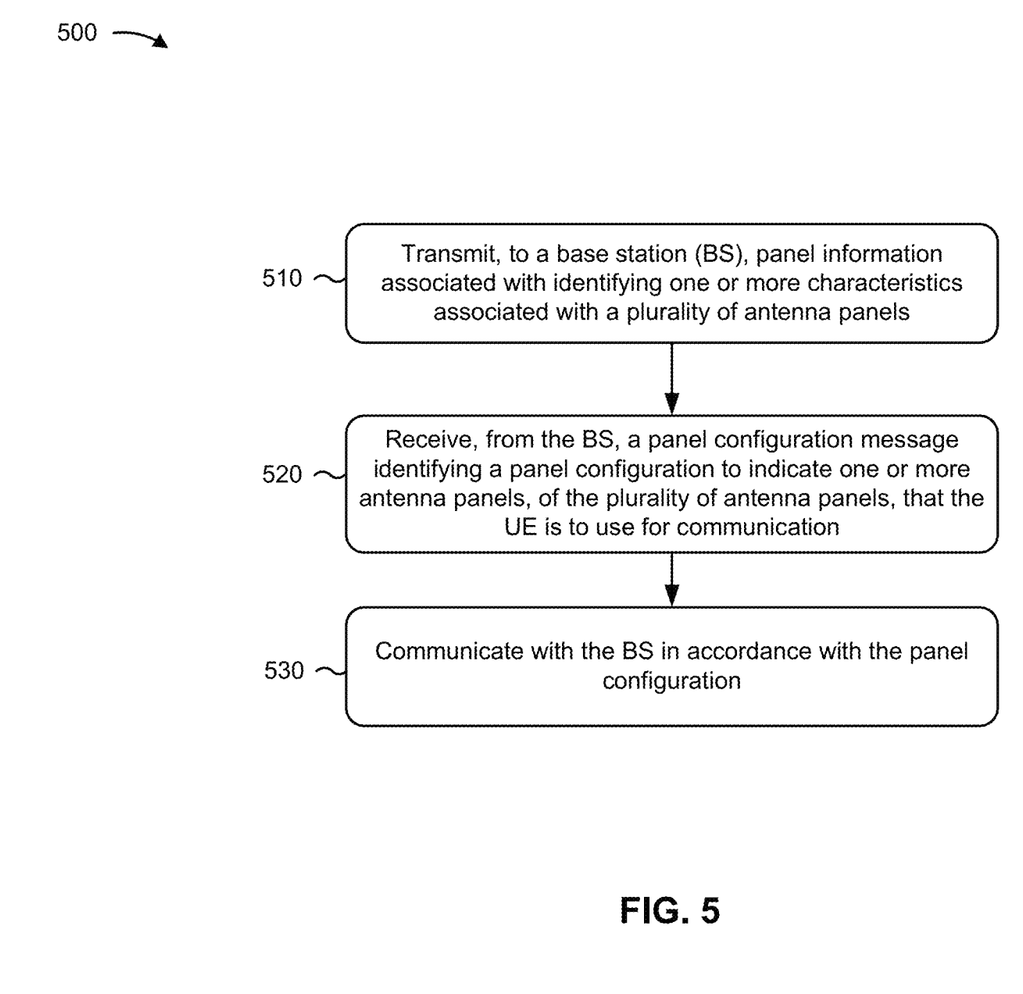
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120) performs management of multiple antenna panels.

As shown in FIG. 5, in some aspects, process 500 may include transmitting, to a base station (BS), panel information associated with identifying one or more characteristics associated with a plurality of antenna panels (block 510). For example, the UE (e.g., using controller/processor 280, transmit processor 264, TX MIMO processor 266, MOD 254, antenna 252, and/or the like) may transmit, to a base station (BS), panel information associated with identifying one or more characteristics associated with a plurality of antenna panels, as described in more detail above.

As shown in FIG. 5, in some aspects, process 500 may include receiving, from the BS, a panel configuration message identifying a panel configuration to indicate one or more antenna panels, of the plurality of antenna panels, that the UE is to use for communication (block 520). For example, the UE (e.g., using controller/processor 280, transmit processor 264, TX MIMO processor 266, MOD 254, antenna 252, and/or the like) may receive, from the BS, a panel configuration message identifying a panel configuration to indicate one or more antenna panels, of the plurality of antenna panels, that the UE is to use for communication, as described in more detail above.

As shown in FIG. 5, in some aspects, process 500 may include communicating with the BS in accordance with the panel configuration (block 530). For example, the UE (e.g., using antenna 252, DEMOD 254, MIMO detector 256, receive processor 258, controller/processor 280, transmit processor 264, TX MIMO processor 266, MOD 254, antenna 252, and/or the like) may communicate with the BS in accordance with the panel configuration, as described in more detail above.

Process 500 may include additional aspects, such as any single aspect and/or any combination of aspects described below and/or in connection with one or more other processes described elsewhere herein.

In a first aspect, the one or more characteristics associated with the plurality of antenna panels includes a characteristic identifying at least one of a quantity of antenna panels of the UE, a grouping of antenna panels, of the plurality of antenna panels, for concurrent activation or deactivation, or a quantity of antenna elements of a particular antenna panel of the plurality of antenna panels. In a second aspect, alone or in combination with the first aspect, the panel information is conveyed in a UE capability report or a radio resource control (RRC) message. In a third aspect, alone or in combination with one or more of the first and second aspects, the panel configuration indicates a set of default antenna panels or a set of anchor antenna panels. In a fourth aspect, alone or in combination with one or more of the first through third aspects, the set of default antenna panels or the set of anchor antenna panels includes a fixed antenna panel associated with a fixed index or a particular antenna panel associated with a bandwidth part or carrier.

In a fifth aspect, alone or in combination with one or more of the first through fourth aspects, a first antenna panel, of the plurality of antenna panels, is a first subset of antenna elements of a particular antenna panel and a second antenna panel, of the plurality of antenna panels, is a second subset of antenna elements of the particular antenna panel. In a sixth aspect, alone or in combination with one or more of the first through seventh aspects, the plurality of antenna panels is a set of separate physical arrays, panels, or microchips located in different locations or orientations on the UE. In an eighth aspect, alone or in combination with one or more of the first through seventh aspects, the UE is configured to transmit or receive at least one of a control channel or a data channel using a default antenna panel, of the one or more antenna panels, via a beam paired link associated with the default antenna panel. In a ninth aspect, alone or in combination with one or more of the first through eighth aspects, an inactive antenna panel, of the plurality of antenna panels and not included in the one or more antenna panels, operates in a sleep state based at least in part on the panel configuration, and the UE is configured to forgo communicating with the BS using the inactive antenna panel.

In a tenth aspect, alone or in combination with one or more of the first through ninth aspects, the panel configuration message is an activation message or a deactivation message for one or more supplementary antenna panels of the plurality of antenna panels. In an eleventh aspect, alone or in combination with one or more of the first through tenth aspects, the activation message or the deactivation message is configured to activate or deactivate a single antenna panel or a group of antenna panels. In a twelfth aspect, alone or in combination with one or more of the first through eleventh aspects, the UE is configured to transmit a request for the activation message or the deactivation message based at least in part on a link quality determination.

In a thirteenth aspect, alone or in combination with one or more of the first through twelfth aspects, the UE is configured to receive the activation message or the deactivation message via at least one of a media access control (MAC) control element (CE) message, a dedicated downlink control information message, a field of a downlink control information message, a cross-panel scheduling message of a transmission configuration indication (TCI) field, a beam indicator indicating a beam associated with a particular antenna panel, a bandwidth part switching message, a secondary cell activation message, or a radio resource management measurement. In a fourteenth aspect, alone or in combination with one or more of the first through thirteenth aspects, the activation message or deactivation message is transmitted in connection with a downlink or uplink scheduling message, and a scheduling offset is configured to accommodate activation latency. In a fifteenth aspect, alone or in combination with one or more of the first through fourteenth aspects, the UE is configured to use a default antenna panel and one or more secondary antenna panels for multi-link diversity or higher-rank transmission based at least in part on receiving the activation message or the deactivation message.

In a sixteenth aspect, alone or in combination with one or more of the first through fifteenth aspects, the UE is configured to transmit a sounding reference signal for a newly activated antenna panel in connection with receiving the activation message or the deactivation message. In a seventeenth aspect, alone or in combination with one or more of the first through sixteenth aspects, the UE is configured to receive a channel state information reference signal or a tracking reference signal and, based at least in part on the receiving the channel state information reference signal or the tracking reference signal, to ramp-up a particular antenna panel of the one or more antenna panels in connection with receiving the activation message or the deactivation message. In an eighteenth aspect, alone or in combination with one or more of the first through seventeenth aspects, the UE is configured to transmit a request for the channel state information reference signal.

In a nineteenth aspect, alone or in combination with one or more of the first through eighteenth aspects, the UE is configured to receive the activation message or the deactivation message in connection with expiration of an inactivity timer. In a twentieth aspect, alone or in combination with one or more of the first through nineteenth aspects, the inactivity timer is an antenna panel-specific inactivity timer or an activation message-specific inactivity timer. In a twenty-first aspect, alone or in combination with one or more of the first through twentieth aspects, the inactivity timer is related to transmission or reception of signals using at least one antenna panel of the one or more antenna panels.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station (BS), comprising:
   receiving, from a user equipment (UE) with a plurality of antenna panels, panel information associated with identifying one or more characteristics associated with the plurality of antenna panels;
   transmitting, to the UE, a panel configuration message identifying a panel configuration to indicate one or more antenna panels, of the plurality of antenna panels, that the UE is to; deactivate; and
   communicating with the UE in accordance with the panel configuration.

2. The method of claim 1, wherein the one or more characteristics associated with the plurality of antenna panels includes a characteristic identifying at least one of:
   a quantity of antenna panels of the UE,
   a grouping of antenna panels, of the plurality of antenna panels, for concurrent activation or deactivation, or
   a quantity of antenna elements of a particular antenna panel of the plurality of antenna panels.

3. The method of claim 1, wherein the panel information is conveyed in a UE capability report or a radio resource control (RRC) message.

4. The method of claim 1, wherein the panel configuration indicates a set of default antenna panels or a set of anchor antenna panels.

5. The method of claim 4, wherein the set of default antenna panels or the set of anchor antenna panels includes a fixed antenna panel associated with a fixed index or a particular antenna panel associated with a bandwidth part or carrier.

6. The method of claim 1, wherein a first antenna panel, of the plurality of antenna panels, is a first subset of antenna elements of a particular antenna panel and a second antenna panel, of the plurality of antenna panels, is a second subset of antenna elements of the particular antenna panel.

7. The method of claim 1, wherein the plurality of antenna panels is a set of separate physical arrays, panels, or microchips located in different locations or orientations on the UE.

8. The method of claim 1, wherein the BS is configured to transmit or receive at least one of a control channel or a data channel using a default antenna panel, of the one or more antenna panels, via a beam paired link associated with the default antenna panel.

9. The method of claim 1, wherein an inactive antenna panel, of the plurality of antenna panels and not included in the one or more antenna panels, operates in a sleep state based at least in part on the panel configuration, and
   wherein the BS is configured to forgo communicating with the UE using the inactive antenna panel.

10. The method of claim 1, wherein the panel configuration message is an activation message or a deactivation message for one or more supplementary antenna panels of the plurality of antenna panels.

11. The method of claim 10, wherein the activation message or the deactivation message is configured to activate or deactivate a single antenna panel or a group of antenna panels.

12. The method of claim 10 wherein the BS is configured to transmit the activation message or the deactivation message as a response to receiving a request from the UE, and
wherein the request is triggered based at least in part on a link quality determination.

13. The method of claim 10, wherein the BS is configured to transmit the activation message or the deactivation message using at least one of:
a media access control (MAC) control element (CE) message,
a dedicated downlink control information message,
a field of a downlink control information message,
a cross-panel scheduling message of a transmission configuration indication (TCI) field,
a beam indicator indicating a beam associated with a particular antenna panel,
a bandwidth part switching message,
a secondary cell activation message, or
a radio resource management measurement.

14. The method of claim 10, wherein the activation message or deactivation message is transmitted in connection with a downlink or uplink scheduling message, and
wherein a scheduling offset is configured to accommodate activation latency.

15. A method of wireless communication performed by a user equipment (UE), comprising:
transmitting, to a base station (BS), panel information associated with identifying one or more characteristics associated with a plurality of antenna panels;
receiving, from the BS, a panel configuration message identifying a panel configuration to indicate one or more antenna panels, of the plurality of antenna panels, that the UE is to deactivate; and
communicating with the BS in accordance with the panel configuration.

16. The method of claim 15, wherein the one or more characteristics associated with the plurality of antenna panels includes a characteristic identifying at least one of:
a quantity of antenna panels of the UE,
a grouping of antenna panels, of the plurality of antenna panels, for concurrent activation or deactivation, or
a quantity of antenna elements of a particular antenna panel of the plurality of antenna panels.

17. The method of claim 15, wherein the panel information is conveyed in a UE capability report or a radio resource control (RRC) message.

18. The method of claim 15, wherein the panel configuration indicates a set of default antenna panels or a set of anchor antenna panels.

19. The method of claim 18, wherein the set of default antenna panels or the set of anchor antenna panels includes a fixed antenna panel associated with a fixed index or a particular antenna panel associated with a bandwidth part or carrier.

20. The method of claim 15, wherein a first antenna panel, of the plurality of antenna panels, is a first subset of antenna elements of a particular antenna panel and a second antenna panel, of the plurality of antenna panels, is a second subset of antenna elements of the particular antenna panel.

21. The method of claim 15, wherein the plurality of antenna panels is a set of separate physical arrays, panels, or microchips located in different locations or orientations on the UE.

22. The method of claim 15, wherein the UE is configured to transmit or receive at least one of a control channel or a data channel using a default antenna panel, of the one or more antenna panels, via a beam paired link associated with the default antenna panel.

23. The method of claim 15, wherein an inactive antenna panel, of the plurality of antenna panels and not included in the one or more antenna panels, operates in a sleep state based at least in part on the panel configuration, and
wherein the UE is configured to forgo communicating with the BS using the inactive antenna panel.

24. The method of claim 15, wherein the panel configuration message is an activation message or a deactivation message for one or more supplementary antenna panels of the plurality of antenna panels.

25. The method of claim 24, wherein the activation message or the deactivation message is configured to activate or deactivate a single antenna panel or a group of antenna panels.

26. The method of claim 24, wherein the UE is configured to transmit a request for the activation message or the deactivation message based at least in part on a link quality determination.

27. The method of claim 24, wherein the UE is configured to receive the activation message or the deactivation message via at least one of:
a media access control (MAC) control element (CE) message,
a dedicated downlink control information message,
a field of a downlink control information message,
a cross-panel scheduling message of a transmission configuration indication (TCI) field,
a beam indicator indicating a beam associated with a particular antenna panel,
a bandwidth part switching message,
a secondary cell activation message, or
a radio resource management measurement.

28. The method of claim 24, wherein the activation message or deactivation message is transmitted in connection with a downlink or uplink scheduling message, and
wherein a scheduling offset is configured to accommodate activation latency.

29. A base station for wireless communication, comprising:
a memory; and
one or more processors operatively coupled to the memory, the memory and the one or more processors configured to:
receive, from a user equipment (UE) with a plurality of antenna panels, panel information associated with identifying one or more characteristics associated with the plurality of antenna panels;
transmit, to the UE, a panel configuration message identifying a panel configuration to indicate one or more antenna panels, of the plurality of antenna panels, that the UE is to deactivate; and
communicate with the UE in accordance with the panel configuration.

30. A user equipment (UE) for wireless communication, comprising:
a memory; and
one or more processors operatively coupled to the memory, the memory and the one or more processors configured to:
transmit, to a base station (BS), panel information associated with identifying one or more characteristics associated with a plurality of antenna panels;

receive, from the BS, a panel configuration message identifying a panel configuration to indicate one or more antenna panels, of the plurality of antenna panels, that the UE is to deactivate; and communicate with the BS in accordance with the panel configuration.

31. The method of claim 1, wherein the panel configuration indicates one or more additional antenna panels, of the plurality of antenna panels, that the UE is to activate and use for communication, wherein at least one antenna panel, of the one or more antenna panels, is a default antenna panel, and wherein at least one additional antenna panel, of the one or more additional antenna panels, is a secondary antenna panel.

32. The method of claim 15, wherein the panel configuration indicates one or more additional antenna panels, of the plurality of antenna panels, that the UE is to activate and use for communication, wherein at least one antenna panel, of the one or more antenna panels, is a default antenna panel, and wherein at least one additional antenna panel, of the one or more additional antenna panels, is a secondary antenna panel.

33. The base station of claim 29, wherein the panel configuration indicates one or more additional antenna panels, of the plurality of antenna panels, that the UE is to activate and use for communication, wherein at least one antenna panel, of the one or more antenna panels, is a default antenna panel, and wherein at least one additional antenna panel, of the one or more additional antenna panels, is a secondary antenna panel.

34. The UE of claim 30, wherein the panel configuration indicates one or more additional antenna panels, of the plurality of antenna panels, that the UE is to activate and use for communication, wherein at least one antenna panel, of the one or more antenna panels, is a default antenna panel, and wherein at least one additional antenna panel, of the one or more additional antenna panels, is a secondary antenna panel.

* * * * *